(12) United States Patent
Paloheimo

(10) Patent No.: US 6,808,631 B2
(45) Date of Patent: Oct. 26, 2004

(54) AEROBIC WASTEWATER TREATMENT APPARATUS

(76) Inventor: Rolf Paloheimo, 152 Sparkhall Avenue, Toronto, Ontario (CA), M4K 1C8

( * ) Notice: Subject to any disclaimer, the term of this patent is extended or adjusted under 35 U.S.C. 154(b) by 154 days.

(21) Appl. No.: 10/277,351

(22) Filed: Oct. 22, 2002

(65) Prior Publication Data
US 2004/0074839 A1 Apr. 22, 2004

(51) Int. Cl.[7] ................................................. C02F 3/02
(52) U.S. Cl. .................... 210/615; 210/620; 210/622; 210/150
(58) Field of Search ................................. 210/615, 620, 210/621, 622, 150, 151

(56) References Cited

U.S. PATENT DOCUMENTS

| 4,427,548 A | 1/1984 | Quick, Jr. |
| 4,472,358 A * | 9/1984 | Khudenko .................. 422/141 |
| 5,531,894 A | 7/1996 | Ball et al. |
| 5,545,327 A | 8/1996 | Volland |
| 5,582,732 A | 12/1996 | Mao et al. |
| 6,153,094 A | 11/2000 | Jowett et al. |
| 6,241,222 B1 * | 6/2001 | Lang ........................... 261/94 |

* cited by examiner

Primary Examiner—Robert A. Hopkins
(74) Attorney, Agent, or Firm—Dann Dorfman Herrell & Skillman

(57) ABSTRACT

A wastewater treatment apparatus is provided that has a treatment vessel having an upper and a lower region. The lower region has an inlet through which wastewater to be treated is fed and the upper region has an outlet through which treated water is removed. Within the vessel a series of horizontally stacked baffles are arranged to allow the wastewater to pass from the inlet to the outlet. Each baffle is operable to trap and absorb air and solids from the wastewater.

6 Claims, 4 Drawing Sheets

AEROBIC WASTEWATER TREATMENT APPARATUS

FIELD OF THE INVENTION

This invention relates to the treatment of wastewater and more specifically to an aerobic wastewater treatment apparatus.

BACKGROUND OF THE INVENTION

Wastewater treatment systems are known and can vary from large treatment plants to septic tanks used for on-site treatment.

Generally, most on-site septic tanks consist of a tank into which the wastewater is pumped. Organisms feed on the wastewater producing a mixture of mostly water, sludge and gases. The sludge will remain at the bottom of the tank while the water and gases are siphoned out of the tank. The water is usually filtered again prior to any subsequent use. The sludge accumulates in the tank and periodically needs to be removed and disposed of.

An alternative wastewater treatment system is the activated sludge method. This method uses a continuous flow of wastewater that flows into an aeration chamber in which organisms feed on the waste producing excess sludge, that generally requires further processing, and clarified water. This method produces large amounts of sludge that eventually needs to be disposed of and is quite sensitive to any change in the operating conditions that can subsequently affect the microbial population. Alternatives to this type of system have been proposed, for example in U.S. Pat. No. 5,582,732 (Mao et al.) a method is described that uses a special acclimatized microbial consortia that are less susceptible to changes in operating conditions, and an additional source of liquefied organic contaminants.

Another example of a wastewater treatment method is described in U.S. Pat. No. 5,545,327 (Volland). The method uses a treatment tank that contains a series of spaced apart vertical corrugated sheets. The corrugations on each sheet are aligned to define a pathway for the influent to circulate while creating turbulence and mixing. An aerator system is located in the tank to aerate and circulate the wastewater. The circulation of the wastewater and air results in biological growth on the sheets. The growing biomass that forms on the surface of the sheets is displaced by the turbulence of the wastewater, further some of the microbes developing are killed by the shear stresses surrounding the air bubbles. Solid particles formed by these or other causes will settle at the bottom of the tank. Subsequent removal and disposal of the solid particles is therefore required. This system does not provide a configuration that allows for a long retention time of oxygen in the tank because the vertical sheets define vertical pathways through which the oxygen can easily move.

A further example of a wastewater treatment system is described in U.S. Pat. No. 6,153,094 (Jowett et al.). The system is used with septic tank effluent and utilizes a series of polyurethane foam blocks located in a module over which the effluent is passed. The system also includes an air ventilation means located inside the module to sustain the aerobic activity. The foam blocks are of a configuration that creates a series of spaces between the blocks from which water is drained and through which air can subsequently circulate. This system requires an additional air ventilation unit within the tank which can add cost and increase the size of the system.

The above systems and methods either produce excess sludge that subsequently needs to be disposed of, require relatively large volume or require additional components to be added to the system in order to maintain the required operating conditions, such as internal air ventilation systems.

It is therefore desirable to provide a system that overcomes the limitations discussed above.

SUMMARY OF THE INVENTION

The present invention provides a wastewater treatment apparatus comprising a treatment vessel having an upper and a lower region, the lower region having an inlet for receiving wastewater to be treated and the upper region having an outlet through which treated wastewater is removed. The vessel includes a plurality of horizontally stacked absorbent baffles arranged so as to allow the wastewater to flow from the inlet to the outlet. Each of the baffles is operable to absorb water, trap and absorb air and solids from the wastewater as it flows from the inlet to the outlet The present invention further provides a method for treating wastewater that includes the steps of aerating the wastewater, the passing the aerated wastewater upwardly through a treatment vessel that includes a plurality of horizontally stacked baffles adapted to absorb water, trap and absorb air and solids from the wastewater, and then collecting the treated wastewater.

BRIEF DESCRIPTION OF THE DRAWINGS

Embodiments of the invention will be better understood with reference to the following non-limiting description and the drawings, in which.

DETAILED DESCRIPTION

Figure 1:
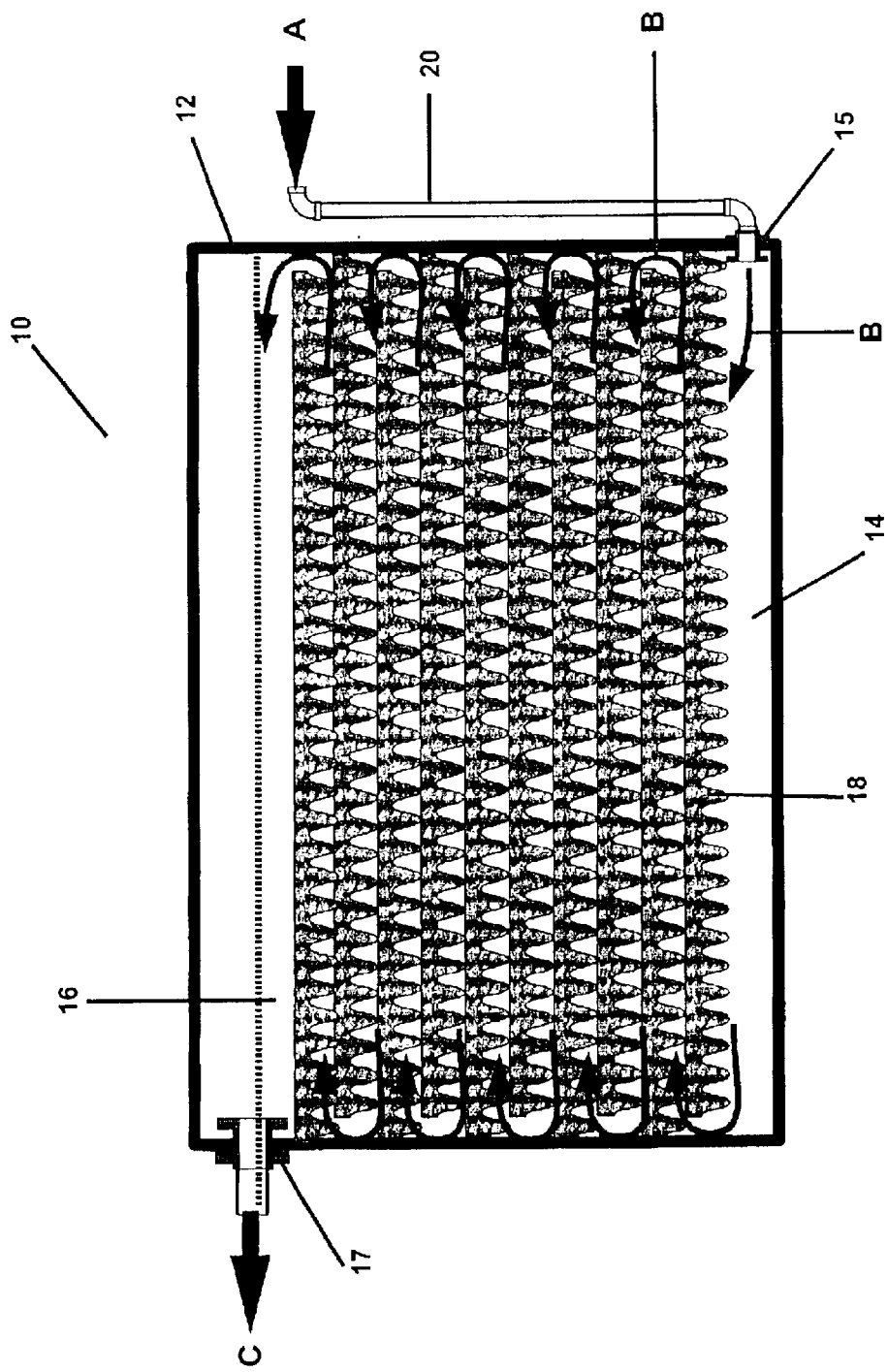
FIG. 1 is a side view of a preferred embodiment of the wastewater treatment apparatus of the present invention including a vessel with a plurality of stacked baffles.

Referring to FIG. 1, a preferred embodiment of a wastewater treatment apparatus 10 of the present invention will now be described. The wastewater treatment apparatus 10 includes a treatment vessel 12 having a lower region 14 an upper region 16 and. The lower region 14 has an inlet 15 for receiving wastewater to be treated and the upper region 16 has an outlet 17 through which treated wastewater is removed. The wastewater treatment apparatus 10 also includes a plurality of horizontally stacked porous baffles 18 located within the vessel. The baffles 18 are arranged so as to allow the wastewater to flow from the inlet 15 to the outlet 17, each of the baffles being configured to absorb water, trap and absorb air and solids from the wastewater as it flows from the inlet 15 to the outlet 17.

The wastewater treatment apparatus 10 is for use with septic tank effluent or other wastewater with low solids content. It functions to reduce the organic components to carbon dioxide ($CO_2$) and water ($H_2O$) and as well as transforming ammonia to nitrates, the quantity of which can then be reduced by microbial action.

As can be seen in FIG. 1, wastewater enters vessel 12 through inlet 15 and follows a labyrinth passageway, discussed below, indicated by arrow B along the length of each baffle 18 from inlet 15 to outlet 17. The vessel 12 illustrated is rectangular in shape, however it will be understood by a person skilled in the art that the vessel may have any shape that allows upward flow of the wastewater to be treated in order to meet the requirements of the present invention. The vessel 12 is enclosed structure and may be made of any suitable material that is durable. Examples of suitable materials are known to persons skilled in the art, and include, for example, concrete. In a preferred embodiment, the baffles 18 are arranged in layers, stacked horizontally one upon the other. Each baffle 18 is shaped to frictionally fit against the edges of the vessel 12 on three sides. The fourth side of each baffle layer, which alternates for each level, does not abut against the edge of vessel 12 but rather is spaced therefrom creating a gap. Within the stack, each baffle 18 is placed so that the fourth side that has the gap alternates for each level. This configuration with alternating baffles creating opposing gaps throughout the stack defines a labyrinth passageway through which the wastewater can flow. It will be understood that if the vessel has more than four sides the baffles may have a configuration that provides a frictional fit with all but one side of the vessel, and that adjacent baffles will alternate as to which side creates a gap adjacent the vessel wall, in order to provide the winding labyrinth passageway through the vessel that will allow for the wastewater, and in particular the air within the wastewater, to have a longer residence time within the vessel. The increased residence time of the wastewater in the vessel 12 circulating along the passageway allows for an increased retention time of oxygen in the vessel thereby increasing the efficiency of oxygen transfer in the vessel. The increase in efficiency also comes from the slow progress of the air bubbles within the vessel, allowing microbes to absorb oxygen without enduring shear stresses. This increase in oxygen transfer will increase the efficiency of aerobic treatment in the vessel allowing the vessel to be smaller and require less energy for aeration.

The baffles 18 are made from material that is capable of trapping and absorbing solids and air and absorbing some water while also allowing the fluid and air to pass through the material. The baffles 18 act as a filter allowing fluid to pass through them while retaining solids within them. Examples of suitable absorbent material that may be used for the baffles includes, but is not limited to, open cellular synthetic foam such as polyurethane foam. However, the baffles 18 may be made of any material in which a variety of microorganisms can take root and feed upon the nutrients in the wastewater reducing them to simpler constituents. As the wastewater travels along the passageway the solid particles are retained and the air is absorbed into the baffles 18 as the fluid passes through. This provides nutrients for the microorganisms to feed and thrive on. The development of active microorganisms is regulated by the quantity of nutrient contained in the wastewater and the oxygen available.

Figure 2:
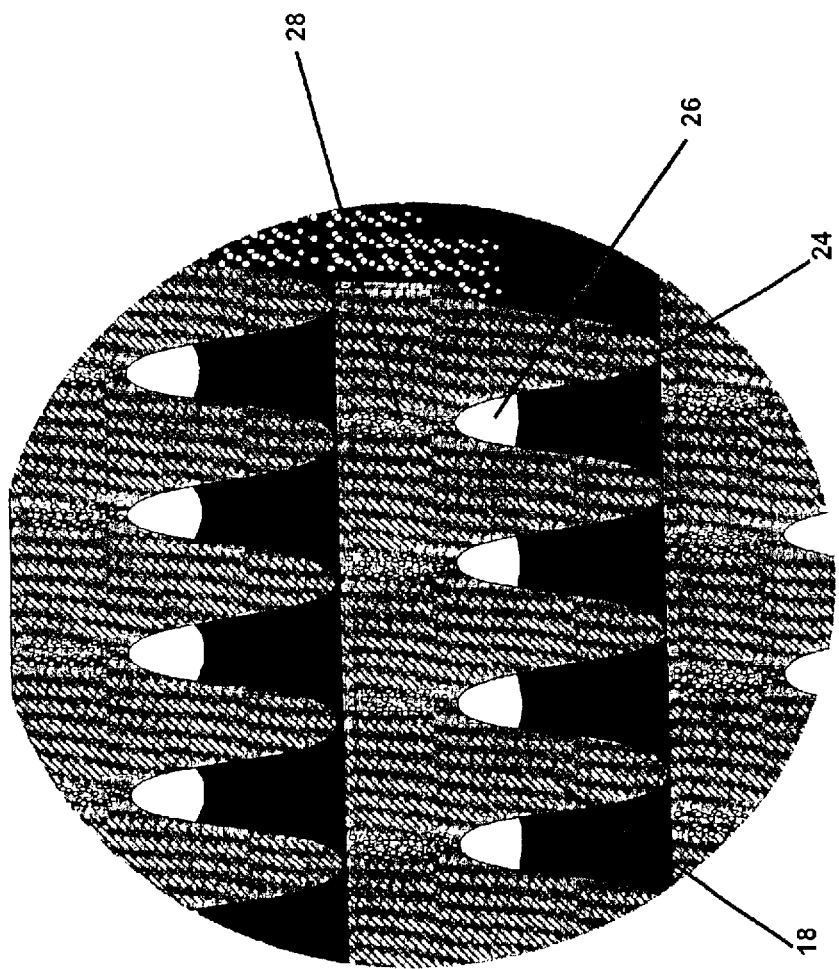
FIG. 2 is an enlarged partial view of the baffles of the wastewater treatment apparatus of FIG. 1.
Figure 3:
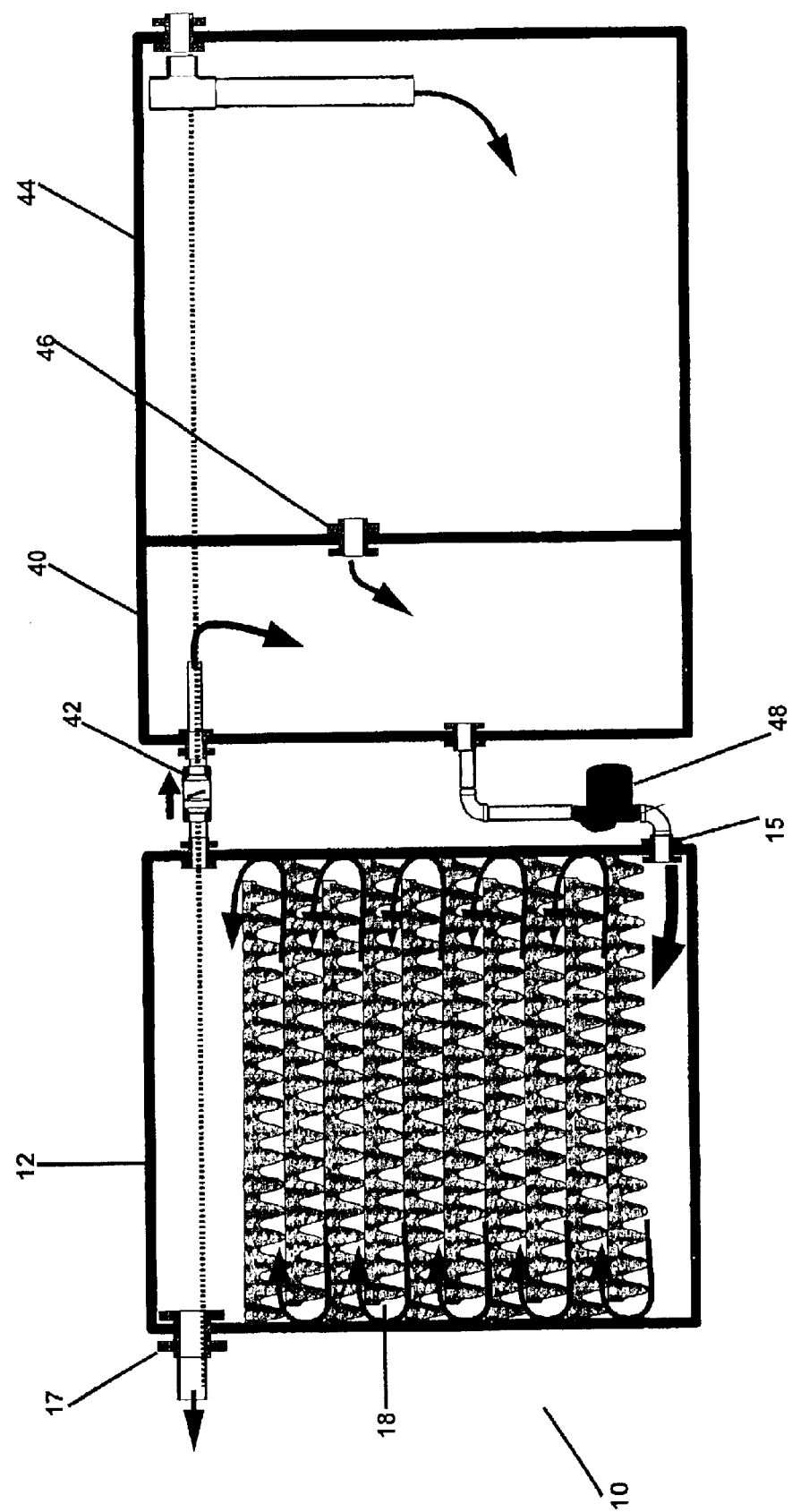
FIG. 3 is an alternative embodiment of the wastewater treatment apparatus of the present invention including a septic tank and a mixing tank.
Figure 4:
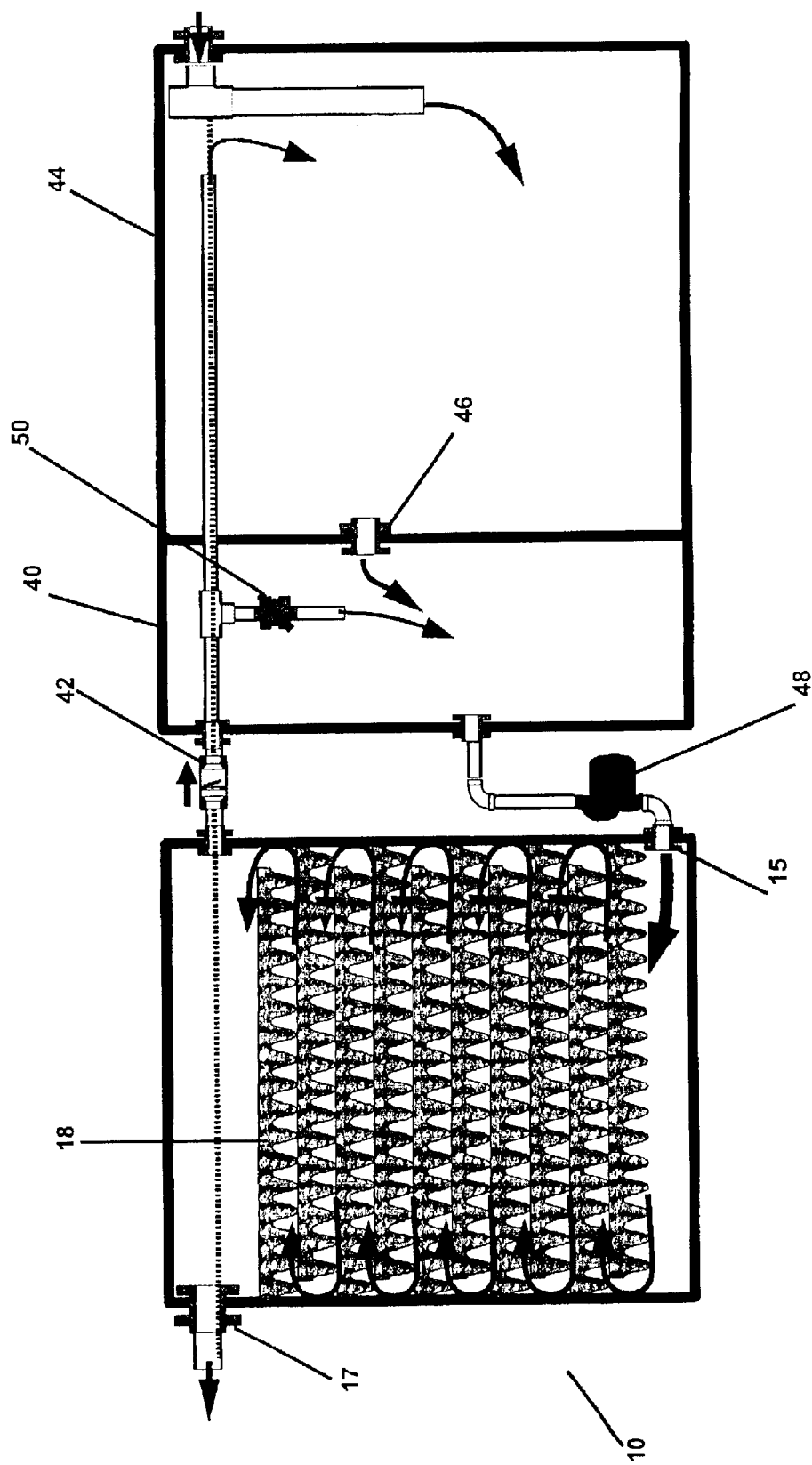
FIG. 4 is an alternative embodiment of the wastewater system of FIG. 3.

Each baffle 18 is configured to trap air and solids from the wastewater, and operable to absorb the air and water. In a preferred embodiment, the lower surface of each baffle 18 includes a series of projections 24, that define recesses 28 between them, as can be seen in FIG. 2. Within the recesses 28, air and solids accumulate during the passage of the wastewater through the vessel 12. In a preferred embodiment, each baffle 18 has a series of projections 24 and recesses 28 located on the lower surface, as shown in FIGS. 1, 3 and 4. However it will be understood that the baffles may be arranged so that alternating baffles 18 have the bottom surface configuration. The upper surface of the baffles 18 can also have a similar configuration of projections and recesses. Alternatively part of the upper and/or lower surface may be configured with a series of projections and recesses.

The projections 24 on the lower surface of the baffles 18 are preferably regular in order that hydrostatic pressure causes the air to distribute evenly among the projections before some of it progresses through the baffle. This will increase the efficiency of oxygen transfer through the baffles 18, increasing the aerobic activity of the microorganisms. Air will also flow to the layer above by passing to the side of the baffle 18 with the gap along the passageways. In this way the water and air have a circuitous path from the bottom to the top of the vessel and the air in particular is retained much longer that it would be if it were an empty vessel.

In a preferred embodiment, there is sufficient space, preferably larger than about 3 mm depending on the strength of the wastewater being treated, between the projections 24 so that the air can accumulate around them and water can flow between them. In a preferred embodiment, the baffles 18 are made of an open celled, or woven, material where the size of the openings or cells of sufficient size, preferably between 0.5 and 1.5 mm that water soaks into the cells and the flow is slow and even throughout the material. Additionally, it is preferable that the size of the cells, preferably between 0.5 and 1.5 mm is such that the air must break up into small bubbles and progress slowly upward if it is to pass through the baffles 18. The projections 24 and the recesses 26 created in between the projections 24 promote complex communities of organisms so that sludge production is minimal.

The use of the wastewater treatment apparatus will now be discussed. Wastewater or septic effluent is aerated and pumped through inlet 15, in the direction of arrow A illustrated in FIG. 1, into the lower region 14 of the vessel 12 under ambient pressure The wastewater flows along the labyrinth passageway, indicated by arrow B, that is defined by the configuration of horizontally stacked baffles 18. The wastewater flows along the length of the first baffle and around the end of the baffle 18 where there is a space, i.e. the gap, between the baffle 18 and the vessel wall. The wastewater will then flow lengthwise along the next baffle 18 and again around the end of the baffle 18 and the passageway will continue along this circuitous route being treated as it passes by and through the baffles 18, discussed further below, until the wastewater reaches the upper region 16 of the vessel 12 where the treated wastewater will exit the vessel 12 through the outlet 17, in the direction of arrow C.

While the wastewater passes along the length of the baffle 18, some of the water will be received in the recesses 26 that are located between the projections 24 located on the lower surface of the baffles 18. When the wastewater is received in the baffle 18 some of it will be absorbed into, and pass through, the baffle 18. The air in the wastewater will also be absorbed by the baffles 18 and will pass through the baffles 18 into the passageway located above each baffle 18, as indicated at 28 in FIG. 2. Once absorbed by the baffle 18 the wastewater provides nutrients in the form of both solids found in the wastewater and the air contained in the wastewater for microorganisms. Once the wastewater has passed through the passageway and baffles 18 located in the vessel 12 the treated wastewater will leave the vessel through outlet 17 and can be further purified, if required. Wastewater can be disposed of directly, or reused for irrigation, toilet flushing, for laundering clothes, industrial processes, decorative ponds, silvaculture or other uses.

The above embodiment, illustrated in FIG. 1, receives the wastewater from a septic tank. In an alternative embodiment the treated wastewater may be collected and a portion recirculated back to the septic tank, to provide for denitrification of the treated wastewater.

In an alternative embodiment, illustrated in FIG. 3, the treated wastewater from the vessel 12 may be mixed with septic effluent, located in a mixing tank 40, via a feed pipe 42, so that the contact time is increased by way of repetitive passes through the wastewater treatment apparatus 10 allowing for the use of a shallower vessel 12 and lower air concentrations. The mixing tank 40 will also receive wastewater from a septic tank 44 that is connected to mixing tank 40 via a conduit 46. The mixed wastewater and treated wastewater will exit the mixing tank 40 and will be aerated by a pump 48 prior to passing through inlet 15. It will be understood that any amount of the treated wastewater may be fed back to be treated again.

In an alternative embodiment, illustrated in FIG. 4, a portion of the treated wastewater is fed through a feed pipe 42 to the septic tank 44 for biological denitrification and another portion mixes with incoming septic effluent located in the mixing tank 40, that is in fluid communication with the septic tank 44 via a conduit 46, to increase efficiency, this also provides a method for flow balancing. The treated wastewater can be fed through the feed pipe 42 and then through a flow adjustment pipe 50 in order to control the amount and flow of the treated wastewater into both the septic tank 44 and the mixing tank 40.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A wastewater treatment apparatus comprising:
    (a) a treatment vessel having an upper and a lower region, wherein said lower region comprises an inlet for receiving wastewater to be treated and said upper region comprises an outlet through which treated wastewater is removed; and
    (b) a plurality of horizontally stacked absorbent baffles located within the vessel, said baffles being arranged so as to allow the wastewater to flow from the inlet to the outlet, each of said baffles being operable to trap and absorb air and solids from the wastewater as it flows from the inlet to the outlet.

2. A wastewater treatment apparatus according to claim 1, wherein the baffles are arranged so as to define a passageway that causes the wastewater to flow from the inlet to the outlet in a circuitous path along the length of each baffle.

3. A wastewater treatment apparatus according to claim 1, wherein the lower surface of the baffles comprises a series of projections defining recesses therebetween in which air and solids can accumulate during the passage of the influent through the vessel.

4. A wastewater treatment apparatus according to claim 1, wherein the apparatus further includes a feedback passage to allow a portion of the treated wastewater to be fed from the outlet to the wastewater to be treated.

5. A method for treating wastewater comprising:
    (i) aerating the wastewater;
    (ii) passing the aerated wastewater upwardly through a treatment vessel comprising a plurality of horizontally stacked baffles adapted to trap and absorb air and solids from the wastewater; and
    (iii) collecting the treated wastewater.

6. A method according to claim 5, wherein a portion of the treated wastewater is recycled back to the wastewater and steps (i) through (iii) are repeated.

* * * * *